United States Patent
Retana et al.

(10) Patent No.: US 9,043,487 B2
(45) Date of Patent: May 26, 2015

(54) DYNAMICALLY CONFIGURING AND VERIFYING ROUTING INFORMATION OF BROADCAST NETWORKS USING LINK STATE PROTOCOLS IN A COMPUTER NETWORK

(75) Inventors: Alvaro E. Retana, Raleigh, NC (US); Alfred C. Lindem, III, Cary, NC (US); Russ White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 1898 days.

(21) Appl. No.: 11/406,222

(22) Filed: Apr. 18, 2006

(65) Prior Publication Data

US 2007/0245034 A1 Oct. 18, 2007

(51) Int. Cl.
| | | |
|---|---|---|
| *H04L 12/761* | (2013.01) | |
| *H04L 12/751* | (2013.01) | |
| *H04L 12/741* | (2013.01) | |
| *H04L 12/28* | (2006.01) | |
| *G06F 15/173* | (2006.01) | |
| *H04L 12/66* | (2006.01) | |

(52) U.S. Cl.
CPC .................. *H04L 45/16* (2013.01); *H04L 12/28* (2013.01); *G06F 15/173* (2013.01); *H04L 12/66* (2013.01); *H04L 45/02* (2013.01); *H04L 45/54* (2013.01)

(58) Field of Classification Search
CPC ......... H04L 12/28; H04L 12/66; H04L 45/16; H04L 45/02; H04L 45/54; G06F 15/173
USPC ........................ 709/238; 370/351, 352, 395.1
See application file for complete search history.

(56) References Cited

U.S. PATENT DOCUMENTS

| 5,519,704 | A | | 5/1996 | Farinacci et al. | |
|---|---|---|---|---|---|
| 5,825,772 | A | * | 10/1998 | Dobbins et al. | 370/396 |
| 6,512,768 | B1 | | 1/2003 | Thomas | |
| 6,741,585 | B1 | * | 5/2004 | Munoz et al. | 370/352 |
| 6,804,712 | B1 | | 10/2004 | Kracht | |

(Continued)

OTHER PUBLICATIONS

Luciani et al., "RFC2332—NBMA Next Hop Resolution Protocol (NHRP)", Published 1998, Network Working Group, hereinafter Luciani.*

(Continued)

*Primary Examiner* — O. C. Vostal
(74) *Attorney, Agent, or Firm* — Novak Druce Connolly Bove + Quigg LLP (57) ABSTRACT

A technique dynamically configures and verifies routing information of broadcast networks using link state protocols in a computer network. According to the novel technique, a router within the broadcast network receives a link state protocol routing information advertisement from an advertising router, e.g., a designated router or other adjacent neighbor. The router learns of a next-hop router ("next-hop") to reach a particular destination from the advertisement, and determines whether the next-hop is located within the same broadcast network (e.g., subnet) as the designated router. If so, the router further determines whether the next-hop is directly addressable (i.e., reachable), such as, e.g., by checking for link adjacencies to the next-hop or by sending request/reply messages (e.g., echo messages or "ping" messages) to the next-hop. In the event the next-hop for the destination is not directly addressable by the router (e.g., no adjacency or reply), the router installs a route to the destination via the designated router. Otherwise, the router installs a route to the destination via the next-hop.

4 Claims, 7 Drawing Sheets

(56) References Cited

U.S. PATENT DOCUMENTS

| | | |
|---|---|---|
| 6,868,068 B1 | 3/2005 | Jain et al. |
| 6,931,441 B1 | 8/2005 | Roden et al. |
| 6,934,256 B1 | 8/2005 | Jacobson et al. |
| 6,963,575 B1* | 11/2005 | Sistanizadeh et al. ........ 370/404 |
| 7,016,313 B1 | 3/2006 | Harper |
| 7,023,808 B2 | 4/2006 | Ball et al. |
| 7,742,459 B2* | 6/2010 | Kwan et al. .................. 370/351 |
| 2003/0126284 A1* | 7/2003 | Houston et al. .............. 709/238 |
| 2003/0137974 A1* | 7/2003 | Kwan et al. .................. 370/352 |
| 2003/0233595 A1 | 12/2003 | Charny et al. |
| 2004/0071135 A1* | 4/2004 | Jimmei et al. ................ 370/386 |
| 2004/0090913 A1 | 5/2004 | Scudder et al. |
| 2004/0261116 A1* | 12/2004 | Mckeown et al. ............ 725/109 |
| 2005/0018667 A1 | 1/2005 | Chandra et al. |
| 2005/0083835 A1 | 4/2005 | Prairie et al. |
| 2005/0105524 A1* | 5/2005 | Stevens et al. ................ 370/389 |
| 2006/0013232 A1 | 1/2006 | Xu et al. |
| 2006/0056328 A1* | 3/2006 | Lehane et al. ................ 370/315 |
| 2006/0200579 A1* | 9/2006 | Vasseur et al. ................ 709/238 |
| 2006/0209716 A1* | 9/2006 | Previdi et al. ................. 370/254 |
| 2006/0215578 A1* | 9/2006 | Andrapalliyal et al. ...... 370/254 |
| 2006/0291446 A1* | 12/2006 | Caldwell et al. .............. 370/351 |
| 2007/0047469 A1* | 3/2007 | Vasseur et al. ................ 370/255 |
| 2007/0058568 A1* | 3/2007 | Previdi et al. ................. 370/254 |
| 2007/0165515 A1* | 7/2007 | Vasseur ......................... 370/216 |
| 2007/0223388 A1* | 9/2007 | Arad et al. .................... 370/252 |

OTHER PUBLICATIONS

Moy, J., RFC 2328, entitled OSPF Version 2, Apr. 1998, pp. 1-204.
Callon, R., RFC 1195, entitled Use of OSI IS-IS for Routing in TCP/IP and Dual Envrionments, Dec. 1990, pp. 1-80.
Postel, J., RFC 792, entitled Internet Control Message Protocol—DARPA Internet Program Protocol Specification, Sep. 1981, pp. 1-21.
Perlman, Radia, Interconnections Second Edition: Bridges, Routers, Switches, and Internetworking Protocols, Section 12.2.4, pp. 317-319, Addison Wesley longman, Inc. 1999.

* cited by examiner

| NEIGHBOR ADDRESS 405 | INTERFACE 410 | STATE 415 | ROUTER ID 420 | PRI 425 | DEAD 430 | OTHERS 435 |
|---|---|---|---|---|---|---|
| A | BROADCAST | FULL | A | ∅ | 40 sec | DATA |
| ... | ... | ... | ... | ... | ... | ... |
| B | BROADCAST | 2-WAY | B | 128 | 42 sec | DATA |
| ... | ... | ... | ... | ... | ... | ... |

NEIGHBOR TABLE 400

| DESTINATION ADDRESS PREFIX 612 | NEXT-HOP INTERFACE 614 | NEXT-HOP ADDRESS 616 | METRIC 618 |
|---|---|---|---|
| ... | ... | ... | ... |
| X | BROADCAST | B/(A) | COST |
| ... | ... | ... | ... |

ROUTING TABLE 600

DYNAMICALLY CONFIGURING AND VERIFYING ROUTING INFORMATION OF BROADCAST NETWORKS USING LINK STATE PROTOCOLS IN A COMPUTER NETWORK

BACKGROUND OF THE INVENTION

1. Field of the Invention

The present invention relates to computer networks and more particularly to dynamically configuring and verifying routing information of broadcast networks using link state protocols in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an AS or an area are generally referred to as a "domain," and a router that interconnects different domains together is generally referred to as a "border router."

Examples of an intradomain routing protocol, or an interior gateway protocol (IGP), are the Open Shortest Path First (OSPF) routing protocol and the Intermediate-System-to-Intermediate-System (ISIS) routing protocol. IGPs may be used to perform routing within domains (ASes) by exchanging routing and reachability information among neighboring intradomain routers of the domains. An adjacency is a relationship formed between selected neighboring (peer) routers for the purpose of exchanging routing information messages and abstracting the network topology. The routing information exchanged by IGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses.

The OSPF and ISIS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled OSPF Version 2, dated April 1998 and the ISIS protocol used in the context of IP is described in RFC 1195, entitled Use of OSI ISIS for routing in TCP/IP and Dual Environments, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state packets (or "IGP Advertisements") for exchanging routing information between interconnected intermediate network nodes (IGP nodes). As used herein, an IGP Advertisement generally describes any message used by an IGP routing protocol for communicating routing information among interconnected IGP nodes, i.e., routers and switches. Operationally, a first IGP node may generate an IGP Advertisement and "flood" (i.e., transmit) the packet over each of its network interfaces coupled to other IGP nodes. Thereafter, a second IGP node may receive the flooded IGP Advertisement and update its routing table based on routing information contained in the received IGP Advertisement.

Next, the second IGP node may flood the received IGP Advertisement over each of its network interfaces, except for the interface at which the IGP Advertisement was received. This flooding process may be repeated until each interconnected IGP node has received the IGP Advertisement and updated its local routing table.

In practice, each IGP node typically generates and disseminates an IGP Advertisement whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

As noted, IGP Advertisements are usually flooded until each intermediate network IGP node has received an IGP Advertisement from each of the other interconnected intermediate nodes, which may be stored in a link state database (LSDB). Then, each of the IGP nodes can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

In a "broadcast network," it is generally assumed that all routers of the network are fully meshed, and can communicate with each and every other router directly. For instance, an ethernet or LAN is an example of a broadcast network, also known as a multi-access network. The broadcast network generally has a "designated router." A designated router is used to originate link state advertisements on behalf of the network (or ensure that link state advertisements are sent, e.g., in IS-IS), and establish adjacencies with all routers on the network, thus participating in synchronization of the LSDBs. Each router of the broadcast network, then, conventionally maintains an adjacency to the designated router which, in turn, indicates that each router of the network is directly addressable (reachable) by the designated router. Notably, designated routers may be selected based on priorities advertised by all the routers of the broadcast network, where the router with the highest priority becomes the designated router (generally a configured selection).

One example of a designated router is a "hub" of a "hub-and-spoke" network architecture, as will be understood by those skilled in the art. Here, the hub router is configured as the designated router, and all the other routers ("spokes") are connected to the hub. Depending on configuration, each spoke may be interconnected to other spokes, but generally each spoke communicates directly to the hub to reach other spokes of the network. In certain circumstances, the spokes may be able to directly communicate with other "remote" spokes.

One problem associated with broadcast networks is that the link state protocols used in the networks assume that the routers are fully meshed. As those skilled in the art will understand, however, this is not always the case. In particular, certain networks, e.g., hub-and-spoke networks or otherwise partially meshed (not fully meshed) networks, appear to be broadcast in nature, when, in fact, not all routers can reach each and every other router (e.g., remote spokes). When link state advertisements are distributed among the network routers, the protocol assumes that the routers can directly address (reach) the next-hop information contained in the advertisement to a particular destination address prefix. If, as in the above circumstances, the router is unable to reach the next-hop directly, the router will be unable to forward traffic to the destination address prefix due to the incorrect next-hop information, and traffic may be lost.

One solution to this problem is to utilize static routing, i.e., manually configuring the routers so that all other routers of the broadcast network are reachable by the designated router (e.g., through configuring frame relay map statements, as will be understood by those skilled in the art). This solution may be difficult to implement and does not adjust to changes in the network. For example, if an advertised next-hop is reachable sometimes and not reachable at other times, (e.g., due to mobility of routers, link flapping, etc.), the static route is inefficient at providing the best path to the destination.

Another solution to the problem of non-full mesh (or broken full mesh) broadcast networks is to configure a point-to-multipoint (P2MP) network option in OSPF networks. The P2MP option injects a host route into the LSDB so all remote routers are deemed reachable by the designated router. Effectively, the P2MP option treats the broadcast network as a collection of point-to-multipoint links, e.g., where the local router forwards traffic to the designated router (point), which then forwards the traffic to any appropriate remote router (multipoint), as will be understood by those skilled in the art. This option is generally a clumsy configuration, creating larger LSDBs in the routers of the network and is difficult to scale in large networks, as will be understood by those skilled in the art.

Again, by operating under the assumption that the network is a broadcast network, link state protocols may cause routing errors, directing a router to reach a particular destination address prefix through a next-hop that is, in fact, unreachable to the router. There remains a need, therefore, for a technique that efficiently and dynamically configures and verifies next-hop reachability information for broadcast networks using link state protocols, particularly for non-fully meshed networks. In other words, there remains a need for a technique that does not assume that advertised next-hops are reachable within a broadcast network.

SUMMARY OF THE INVENTION

The present invention is directed to a technique for dynamically configuring and verifying routing information of broadcast networks using link state protocols in a computer network. According to the novel technique, a router within the broadcast network (e.g., a local area network, or LAN) receives a link state protocol routing information advertisement from an advertising router, e.g., a designated router (such as a hub) or other adjacent neighbor. The router learns of a next-hop router ("next-hop") to reach a particular destination address prefix from the advertisement, and determines whether the next-hop is located within the same broadcast network (e.g., subnet) as the designated router. If so, the router further determines whether the next-hop is directly addressable (i.e., reachable), such as, e.g., by checking for link adjacencies to the next-hop or by sending request/reply messages (e.g., echo messages or "ping" messages) to the next-hop. In the event the next-hop for the destination address prefix is not directly addressable by the router (e.g., no adjacency or reply), the router installs a route to the destination address prefix via the designated router. Otherwise, i.e., the next-hop is directly addressable, the router installs a route to the destination address prefix via the next-hop.

Advantageously, the novel technique dynamically configures and verifies routing information of broadcast networks using link state protocols in a computer network. By confirming that a next-hop to a destination address prefix is directly addressable, the novel technique efficiently and dynamically ensures that correct routing information is used in broadcast networks where the next-hop is conventionally assumed to be reachable, thus alleviating the need for cumbersome manual configuration or other network configurations. In particular, the present invention prevents the installation of unreachable next-hop routes at routers within the broadcast network (e.g., spoke routers or routers within a partial mesh network). Also, failed/removed routes or routes with otherwise limited connectivity between the router and the next-hop may be avoided by periodically confirming the reachability and replacing the failed/removed next-hop routes with routes to the designated router.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
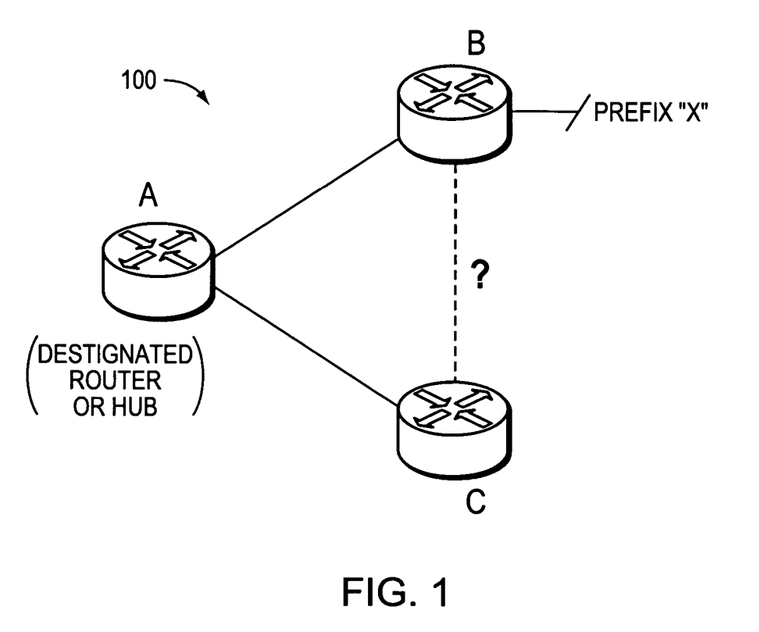
FIG. 1 is a schematic block diagram of an exemplary computer network that may be used in accordance with the present invention.

FIG. 1 is a schematic block diagram of an exemplary computer network 100 that may be advantageously used with the present invention. The network 100 comprises a plurality of interconnected network nodes, such as routers A, B, and C. Illustratively, the routers may be interconnected by one or more links, such as, e.g., over local area network (LAN) links, wireless LANs, etc., to form the network 100. Each router may be used to reach one or more destination address prefixes, such as prefix X from router B as shown. Notably, network 100 may be configured as a full mesh network, where each router is interconnected to each and every other router of the network, or may be configured as a partial mesh network, such as a hub-and-spoke network, as will be understood by those skilled in the art. Those skilled in the art will understand that any number of nodes, links, prefixes, etc., may be used in the computer network 100 and connected in a variety of ways, and that the view shown herein is for simplicity.

Data packets may be exchanged among the routers of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements (LSAs) or link-state packets as described further below.

Figure 2:
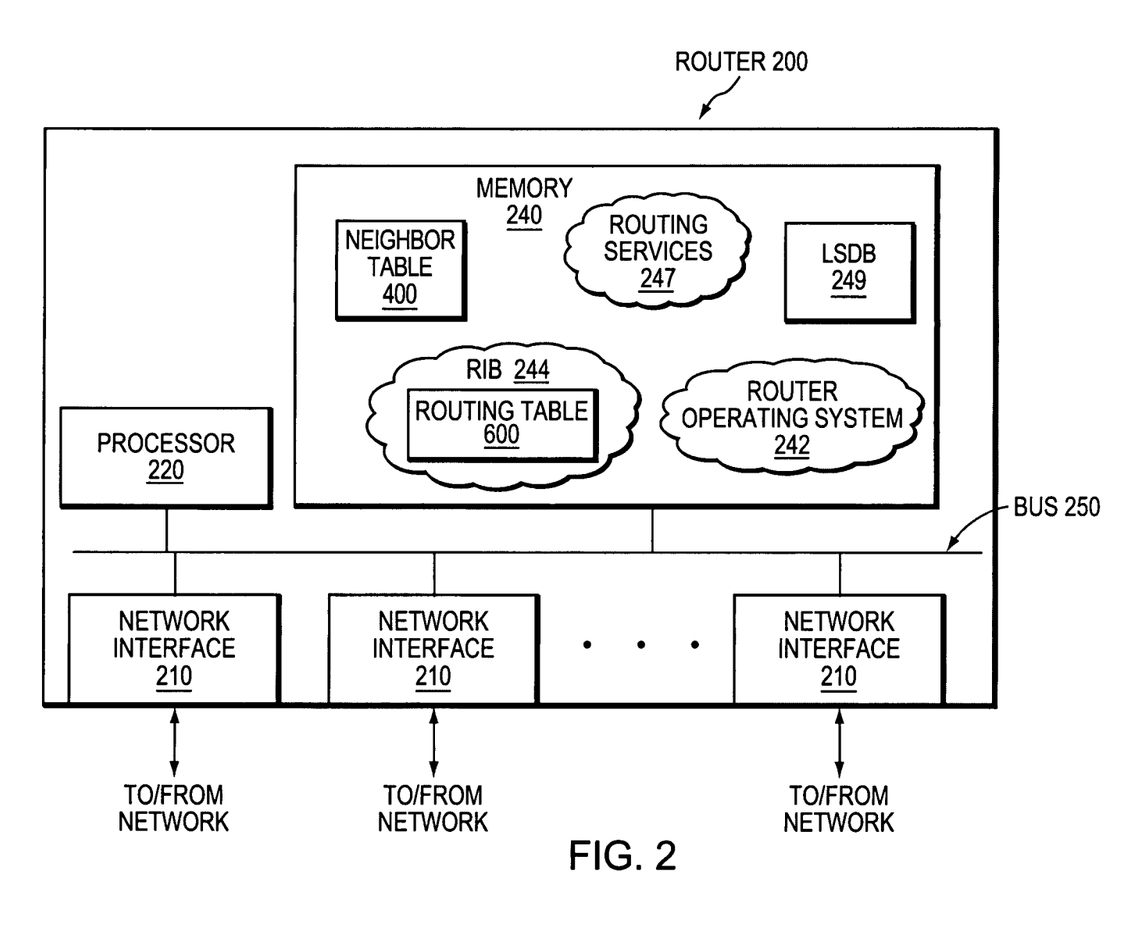
FIG. 2 is schematic block diagram of an exemplary router that may be advantageously used with the present invention.

FIG. 2 is a schematic block diagram of an exemplary node 200, which is illustratively a router that may be advantageously used with the present invention. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data with interconnected network nodes using a variety of different communication protocols, including, inter alia, TCP/IP, UDP, ATM, RSVP, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as link state database (LSDB) 249, neighbor table 400, and routing table 600. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise routing information base (RIB) 244, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), BGP, etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

Changes in the network topology may be communicated among routers 200 using a link-state protocol, such as the conventional OSPF and IS-IS protocols. Suppose, for example, that a communication link fails within a network or a cost value associated with a network node changes. Once the change in the network's state is detected by one of the routers, that router may flood an IGP Advertisement communicating the change to the other routers in the network (e.g., the broadcast network). In this manner, each of the routers eventually "converges" to an identical view of the network topology.

Figure 3:
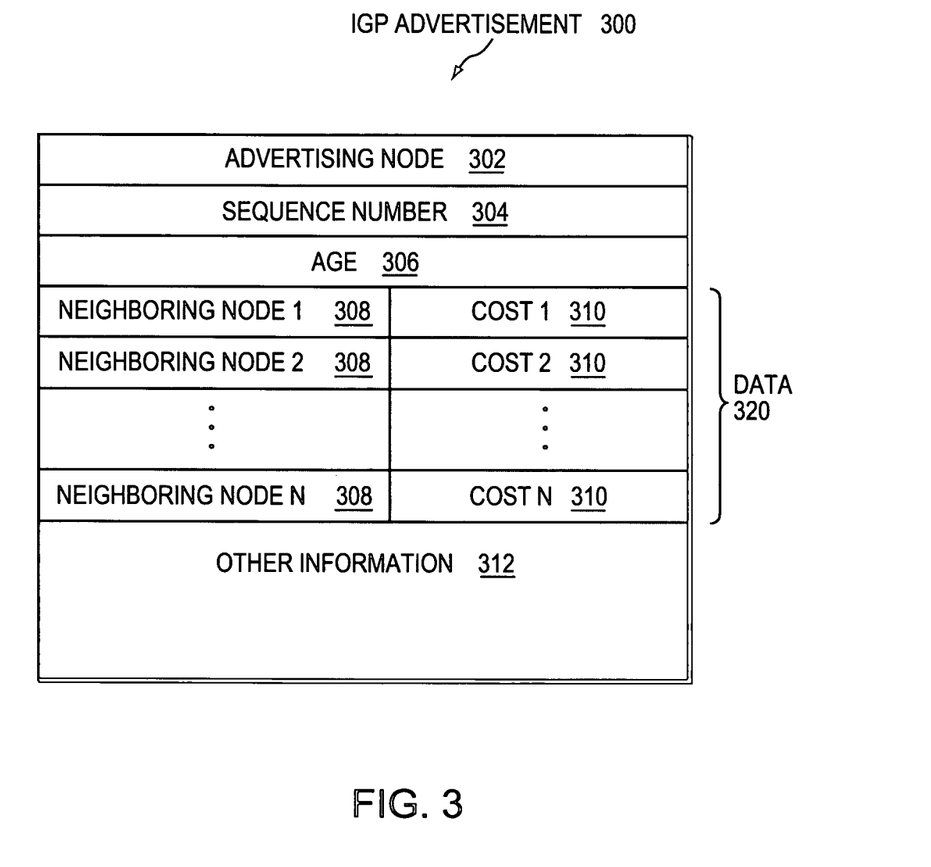
FIG. 3 is a schematic block diagram of an exemplary IGP Advertisement that may be transmitted by the routers.

FIG. 3 illustrates an exemplary IGP Advertisement 300 that may be flooded by the routers 200. The packet includes an advertising-node field 302, a sequence-number field 304, an age field 306, a data section 320, and other routing information 312. Notably, advertisement 300 represents portions of an OSPF packet, but those skilled in the art will understand that an IS-IS or other IGP packet format may also be used in accordance with the present invention. The advertising-node field 302 stores a value that identifies the router that generated and originally broadcast the IGP Advertisement 300. The sequence-number field 304 stores a sequence number indicating the relative version of the IGP Advertisement. Typically, the sequence number stored in the field 304 is incremented, e.g., by one, for every new version of the IGP Advertisement. The IGP Advertisement 300 is therefore considered "stale" (invalid) if its sequence number is less than the sequence number stored in a previously-received version of the IGP Advertisement, i.e., generated by the same advertising node. Accordingly, the routers 200 may be configured to store and forward only the most recent version of an IGP Advertisement, e.g., the version having the largest sequence number.

The age field 306 also stores a value that may be used for determining whether the IGP Advertisement 300 is valid. The age value is typically initialized to a non-zero integer value, often in units of seconds. The age value may be decremented, e.g., by one every second, until the age value reaches zero, thereby indicating that the IGP Advertisement has become invalid. That is, every router 200 that stores or floods the IGP Advertisement 300 continuously ages the packet until the age value equals zero. Those skilled in the art will appreciate that other aging mechanisms alternatively may be used, such as incrementing the IGP Advertisement age value from an initial value, e.g., equal to zero, until the age value reaches a known upper limit.

The data section 320 includes one or more pairs of neighboring-node fields 308 and cost fields 310. Each neighboring-node field 308 stores a value, such as an address, indicating a network node that is directly accessible from the intermediate node stored in the advertising-node field 302. The field 310 stores a cost value that has been associated, e.g., by the advertising node, with the network node identified in the neighboring-node field 308. As shown, each neighboring-node field 308 is associated with only one corresponding cost field 310. However, it is noted that in other embodiments, a single neighboring node may be associated with a plurality of cost values. Other routing information 312 may also be included in the IGP Advertisement 300, such as checksum values, packet-length information, flag values, type-of-service metrics, etc. Generally, the received IGP Advertisements are stored in LSDB 249 of the router 200.

Figure 4:
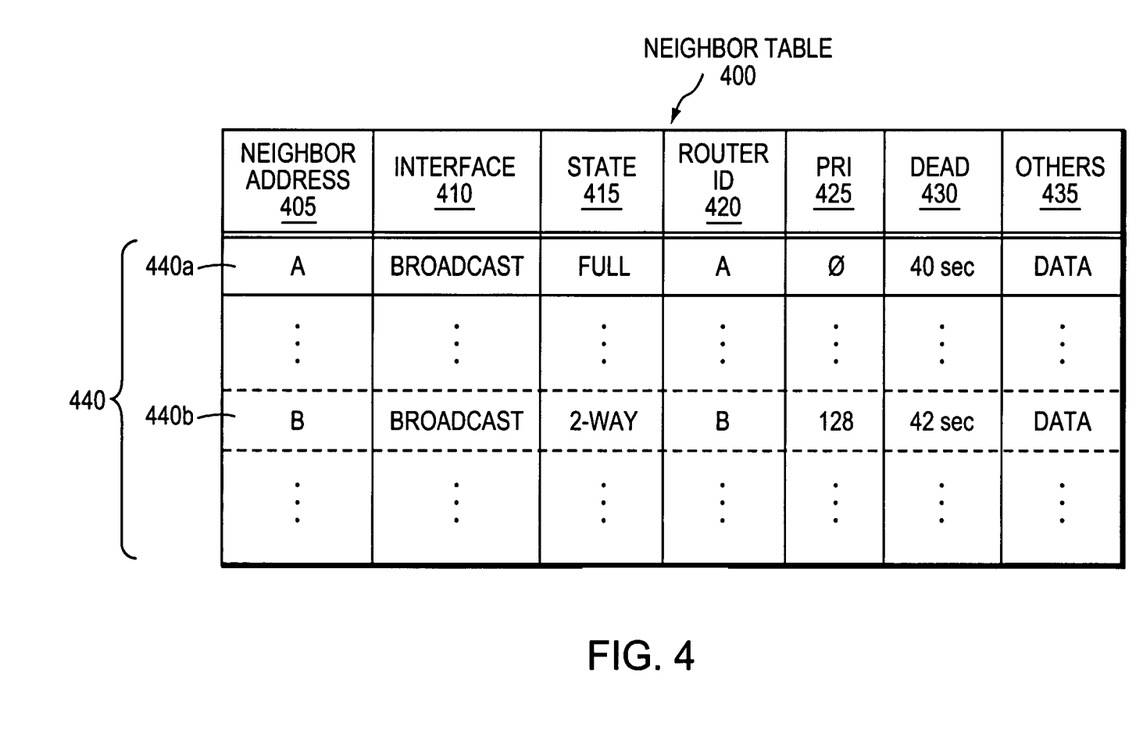
FIG. 4 is schematic block diagram of an exemplary neighbor table that may be advantageously used with the present invention.

Conventionally, OSPF and IS-IS generally exchange hello packets on the broadcast network to determine which adjacent routers are reachable, e.g., through the broadcast interface. The hello packets are a type of IGP Advertisement 300 exchanged between neighbors, having a different packet type (i.e., for "hello" messages), as will be understood by those skilled in the art. The results of the hello packet adjacencies may be stored in a neighbor table at the router. FIG. 4 is a schematic block diagram of an exemplary neighbor table 400 that may be advantageously used with the present invention. Neighbor table 400 is illustratively stored in memory 240 and includes one or more entries 440, each comprising a plurality of fields for storing a neighbor address 405, an interface 410 through which the neighbor is reachable, a state 415 of the neighbor, a router ID 420 of the neighbor, Priority (Pri) 425 of the neighbor to become the designated router, a Dead timer 430 to determine how long until the neighbor becomes unreachable (without an update), and other fields 435. The neighbor table 400 is illustratively maintained and managed by routing services 247 (e.g., OSPF or IS-IS). To that end, the routing services 247 maintains a list of neighbors learned by exchanging hello packets, such as OSPF or IS-IS hello packets.

Illustratively, router C may learn through conventional hello packets that one of its neighbors is router A (entry 440a), reachable via the broadcast interface (or other specific interface, as will be understood by those skilled in the art). The state 415 of router A may be designated as "full," thus indicating that a full adjacency exists between the two routers. Other states 415 may exist in the neighbor table, such as "down," "init," "exchange," etc., as will be understood by those skilled in the art. The router ID 420 of router A may also be included within the table 400. The Priority value 425 of router A illustratively indicates that router A is the designated router for the broadcast network (e.g., the hub), since the highest priority "0" is used. The Dead value 430, e.g., 40 seconds, indicates that router A should exchange a hello packet within 40 seconds to remain a neighbor. Other fields 435, e.g., Area, Opt, DR-ID, Up, Adjacent, etc., may also be used in a conventional manner. (Those skilled in the art will understand that table 400 illustrates a representative "brief" neighbor table, while "detailed" or "extensive" fields have been omitted for clarity.)

In traditional broadcast networks, it is generally assumed that all routers of the network are fully meshed, and can communicate with each and every other router directly. As discussed, above, however, this may not be the case, such as where a link state protocol assumes that the network is a broadcast network, when it fact it is a hub-and-spoke, partial mesh, or broken full mesh network (will failed links). By operating under the assumption that the network is a broadcast network, link state protocols may cause routing errors, directing a router to reach a particular destination address prefix through a next-hop that is, in fact, unreachable to the router.

The present invention is directed to a technique for dynamically configuring and verifying routing information of broadcast networks using link state protocols in a computer network. According to the novel technique, a router within the broadcast network (e.g., a LAN) receives a link state protocol routing information advertisement from an advertising router, e.g., a designated router (such as a hub) or other adjacent neighbor. The router learns of a next-hop router ("next-hop") to reach a particular destination address prefix from the advertisement, and determines whether the next-hop is located within the same broadcast network (e.g., subnet) as the designated router. If so, the router further determines whether the next-hop is directly addressable (i.e., reachable), such as, e.g., by checking for link adjacencies to the next-hop or by sending request/reply messages (e.g., echo messages or "ping" messages) to the next-hop. In the event the next-hop for the destination address prefix is not directly addressable by the router (e.g., no adjacency or reply), the router installs a route to the destination address prefix via the designated router. Otherwise, i.e., the next-hop is directly addressable, the router installs a route to the destination address prefix via the next-hop.

In accordance with one aspect of the present invention, the router (e.g., router C) learns of the destination address prefix (e.g., prefix X) through the advertising router (e.g., router A), and notes the next-hop to reach the destination as advertised (e.g., router B). The router determines whether the next-hop is located within the same broadcast network (e.g., subnet) as the local interface connecting the router to the designated router for the broadcast network. Those skilled in the art will understand various known techniques to perform this determination, such as checking the address of local interface connecting the router to the designated router and its corresponding network mask, and comparing that to the next-hop's address accordingly. If the next-hop (i.e., the address of the next-hop connecting to the designated router) is found to be on the same broadcast network, then it can be assumed that the next-hop (router B) is reachable via the designated router (router A), as will be understood by those skilled in the art.

In accordance with another aspect of the present invention, upon determining that the next-hop (router B) is located within the same broadcast network, the router (router C) further determines whether the next-hop is directly addressable, i.e., reachable. One manner in which the router may determine the next-hop's reachability is to perform a lookup operation into a local table of reachable neighbors created by the link state protocol (OSPF or IS-IS), such as the neighbor table 400. For instance, if router C determines that an entry 440*b* exists for the next-hop router B, and that the state 415 of the next-hop indicates a direct connection (e.g., "2-way," "full," etc.), then router C can positively confirm that the next-hop is reachable (i.e., is a neighbor).

In the event the network (or router) is not configured to exchange hello packets, and/or to store a neighbor table 400 (e.g., not configured to build adjacencies), an alternative manner in which the router may determine the next-hop's reachability is to attempt to transmit a message to the next-hop directly, and wait for a response indicating that the next-hop received the message. This "request/reply" or echo message (e.g., unicast or multicast) may be sent to the main address of the next-hop over the broadcast interface, as will be understood by those skilled in the art. Notably, because of the conventional properties of a link state broadcast network, any neighbors receiving the request/reply message that are not the next-hop addressed in the message simply ignore the message. In this manner, the next-hop (router B) only receives and returns the message if it is directly addressable by the router (router C).

Figure 5:
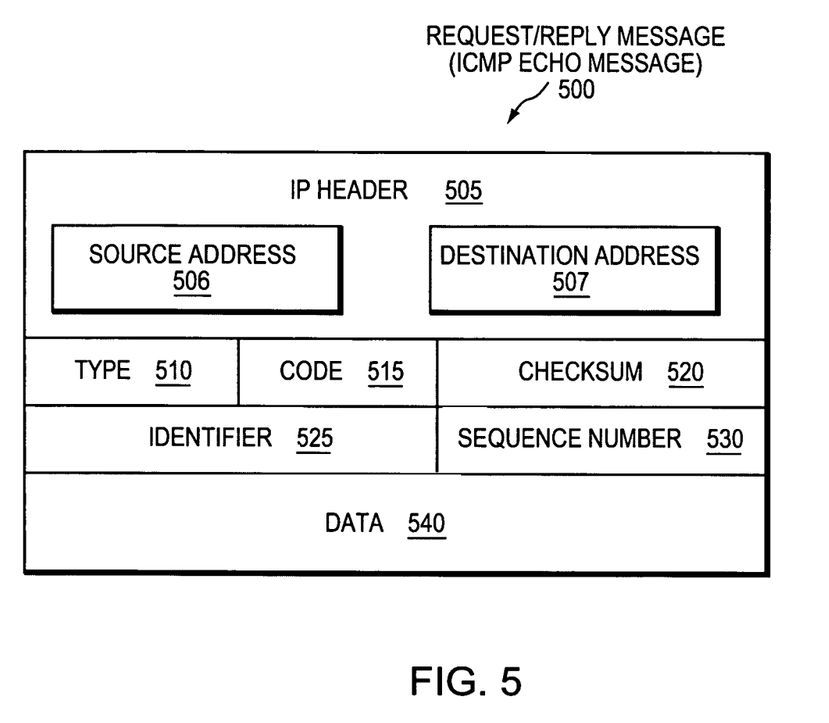
FIG. 5 is a schematic block diagram of an exemplary request/reply message that may be advantageously used with the present invention.

FIG. 5 is a schematic block diagram of an exemplary request/reply message 500 that may be advantageously used with the present invention. Illustratively, request/reply message is embodied as a conventional Internet Control Message Protocol (ICMP) echo message. ICMP echo messages are described in RFC 792, entitled *Internet Control Message Protocol*, dated September 1981, the contents of which are hereby incorporated by reference. Those skilled in the art will understand that while an ICMP echo message is shown, other request/reply messages may be used in accordance with the present invention, such as, e.g., other echo messages, "ping" messages, etc., or other connectivity verification protocol exchanges, such as, e.g., bidirectional forwarding detection (BFD) messages.

The message 500 includes an IP header 505, a type field 510, code field 515, a conventional checksum field 520, an identifier field 525, a sequence number field 530, and a data field 540. The source address 506 and destination address 507 within the header 505 are the network addresses for the sending device (e.g., router C) and the receiving device (e.g., router B), respectively. Type field 510 contains a specific type value indicating whether the message 500 is an echo message (type 8) or an echo reply message (type 0), while the code field 515 of an ICMP echo message is set to "0" in either case. The identifier 525 and sequence number 530 may be used to assist routers in matching echo requests and replies, such as by identifying a particular echo request session with a distinct value (at the sending device), and incrementing the sequence number based on the number of requests sent, as will be understood by those skilled in the art. The data 540 of an echo request is a local matter, since only the sending device processes the content.

To respond to an echo request 500, the receiving device (e.g., router B) replies by interchanging the source address 506 and destination address 507, and changing the type 510 from "8" to "0." In this manner, the echo reply 500 returns to the sending device (e.g., router C). Other fields of the echo request remain the same for the echo reply, such as the identifier 525, sequence number 530, and any included data 540, but a new checksum 520 is computed based on the changed type value. When the reply reaches the sending device of the echo request, the sending device determines that the receiving device is reachable.

Figure 6:
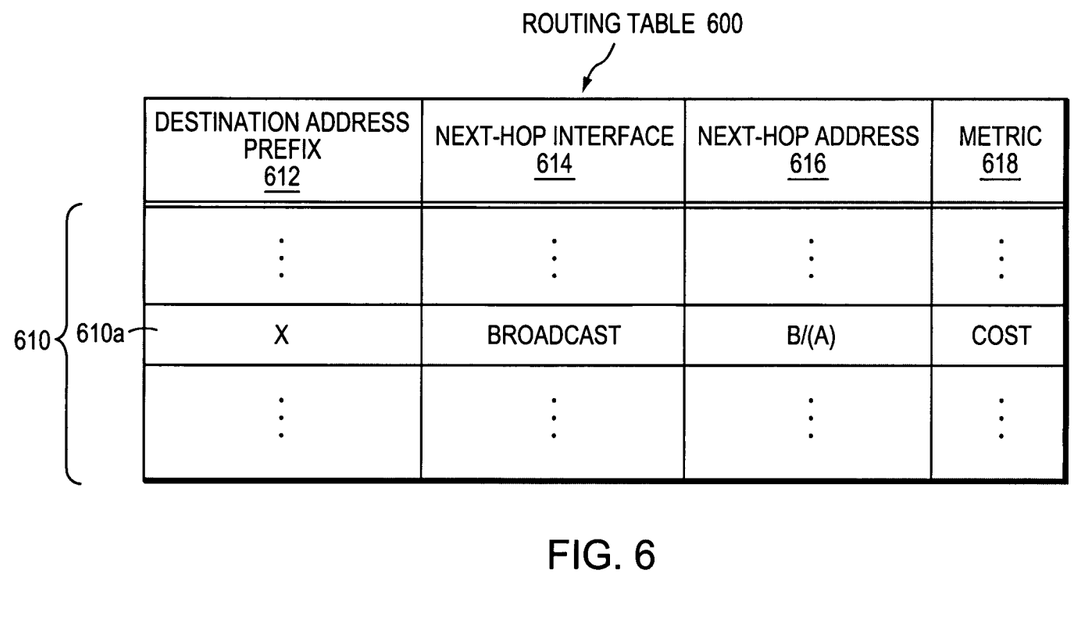
FIG. 6 is schematic block diagram of an exemplary routing table that may be advantageously used with the present invention.

In accordance with yet another aspect of the present invention, in the event the next-hop (router B) is not directly addressable, the router may assume that the next-hop to the destination address prefix (prefix X) is only reachable via the designated router (router A), such as a hub in a hub-and-spoke network. For instance, if, as determined above, the next-hop is not a neighbor with some level of present adjacency (e.g., in neighbor table 400), or if no reply is received for the locally originated message 500 transmitted directly to the next-hop address, then the next-hop is not reachable by the router.

Where the next-hop is not reachable, the router (router C) is configured to install a route (e.g., a host route) to the next-hop via the designated router (e.g., hub) as appropriate. Illustratively, the present invention installs the route into the routing table 600 to change the reachability on the broadcast network accordingly. FIG. 6 is schematic block diagram of exemplary routing table 600 that may be advantageously used with the present invention. Routing table 600 is illustratively stored in memory 240 and includes one or more entries 610, each comprising a plurality of fields for storing a reachable destination address (prefix) 612, a next-hop interface 614 and next-hop address 616 (of the next-hop router) to reach that destination, and an associated metric (e.g., cost) 618 of reaching the destination. The routing table 600 is illustratively maintained and managed by RIB 244. To that end, the RIB 244 maintains copies of routes (paths) provided by the routing protocols, such as IGP, in order to compute best paths/routes for installation into the routing table 600.

Illustratively, assume that router C learns that the destination address prefix "X" is reachable via router B from advertisements 300, as mentioned above. A destination address field 612 of entry 610*a* contains the reachable address X, and the next-hop fields 614, 616, are populated with, e.g., the broadcast interface for the broadcast network and a main address of next-hop router B, respectively. Note that a loopback address of the next-hop may be used as the main address for many reasons, including as a way to avoid depending upon the availability of network interfaces of that node.

If router C determines that router B is reachable in accordance with the present invention described above, the routing table 600 may remain unchanged (but verified), and traffic destined for address prefix X may be routed through router B accordingly. If, however, router C determines that router B is not reachable, then router C dynamically changes the entry 610*a* of the routing table 600 to reflect that the next-hop router 616 is router A (the designated router). Note that in a broadcast network, the next-hop interface 614 may remain as the broadcast interface. Alternatively, e.g., for non-broadcast networks, the next-hop interface 614 may also change to reflect the next-hop router 616 as will be understood by those skilled in the art.

As those skilled in the art will also understand, changing the routes as stored in the routing table 600, as opposed to re-configuring the LSDB 249, reduces the amount of information that would be stored in the LSDB, thus providing a scalable approach to the additional determined information. Moreover, as will be understood, the present invention may also be applied by changing forwarding tables (e.g., forwarding information bases, "FIBs") in a similar manner to redirect the traffic to a new next-hop, i.e., without the need to change routing information (e.g., in routing table 600). Further, the techniques described above allow for data plane optimization without additional control plane overhead. For instance, data packets sent from the routers (e.g., router C) may take optimal paths across the hub-and-spoke or partial mesh broadcast network without requiring link state protocol adjacencies to each other router (e.g., routers other than the designated router).

Notably, the present invention may also be used with a conventionally full meshed broadcast network (in addition to partial mesh or hub-and-spoke networks), e.g., to repair links between routers that may occasionally fail. In particular, because of the nature of link state protocol broadcast networks, when a link between two routers fails, but each of the routers remain functional, the network generally does not reconverge to update the LSDB 249 of the routers, as will be understood by those skilled in the art. Traffic that may have been originally forwarded over the failed or "broken" link may now be lost until the link returns. Also, in non-stable broadcast networks, such as where routers and devices move in and out of the network (e.g., mobility, wireless, hidden terminals, fading, etc.), the next-hop may be reachable at one time, but not another. This also applies to partial failures, e.g., where communication over the link permits one-way transmission, but the link is not actually useful for transmitting traffic properly.

Accordingly, the sending router (e.g., router C) may wish to periodically verify the reachability of the next-hop (e.g., router B) to the destination address prefix (e.g., prefix X). For instance, the router may verify the next-hop's reachability by re-transmitting request/reply messages 500 as needed, such as, e.g., based on a timed interval (e.g., 30 seconds, 1 minute, etc.), or when initiating a traffic flow to the destination address prefix, for example, where a spoke router forwards most traffic to the hub, but verifies connectivity when occasionally sending traffic directly to a remote spoke router. Alternatively, where adjacency hello messages 300 are exchanged, the Dead timer 430 (of the neighbor table) may be used to monitor and determine when a next-hop neighbor is no longer reachable. In the event the next-hop becomes unreachable (e.g., the connection is lost), the router may redirect traffic to the destination address prefix to traverse the designated router (e.g. router A), thus redirecting the traffic around failures. Conversely, should the next-hop become reachable, the router may redirect traffic back to the next-hop directly. Those skilled in the art will understand that various hold timers or other oscillation dampening techniques may be advantageously used in such situations, such as where the reachability to the next-hop "flaps" (continuously becomes reachable and unreachable).

Figure 7:
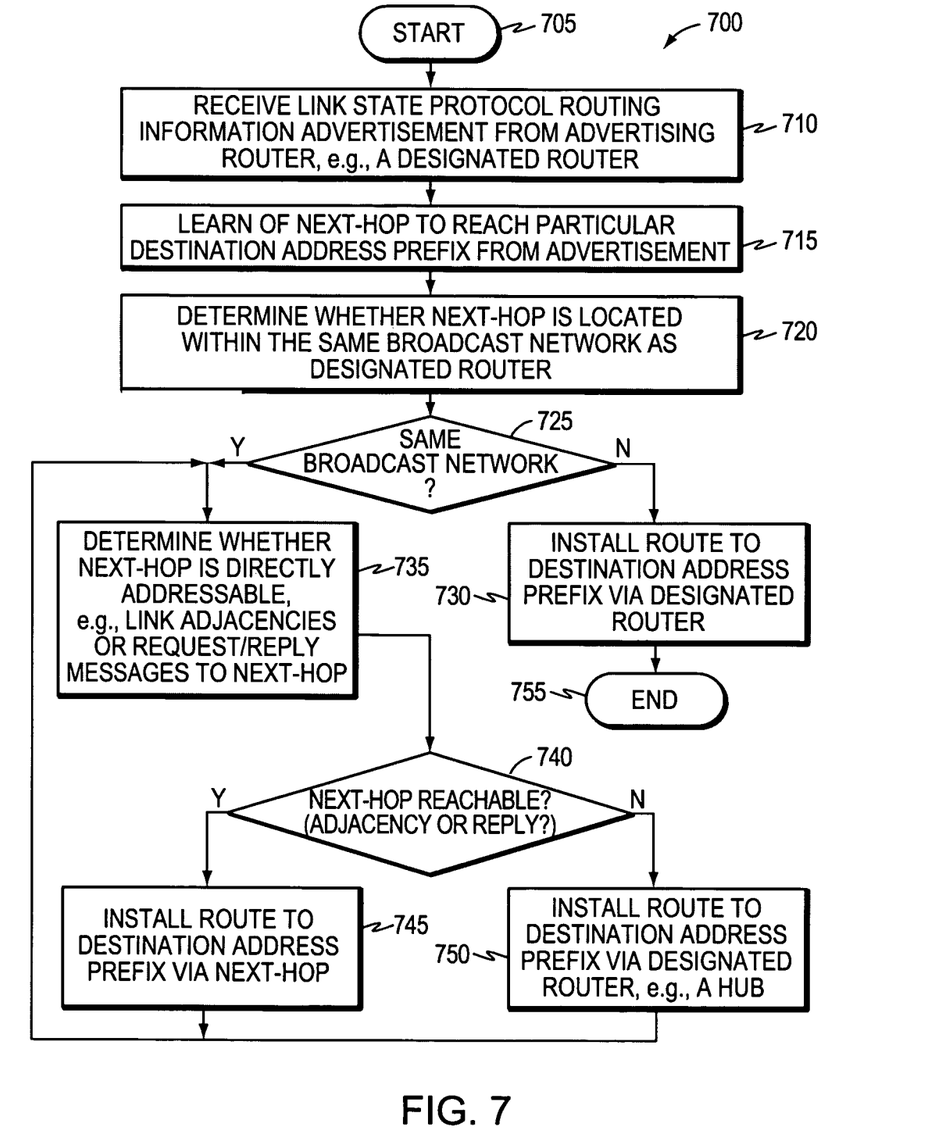
FIG. 7 is a flowchart illustrating a procedure for dynamically configuring and verifying routing information of broadcast networks using link state protocols in accordance with the present invention.

FIG. 7 is a flowchart illustrating a procedure for dynamically configuring and verifying routing information of broadcast networks using link state protocols in accordance with the present invention. The procedure 700 starts at step 705, and continues to step 710, where the router (e.g., router C) receives a link state protocol routing information advertisement (e.g., advertisement 300) from an advertising router (e.g., router A), such as a designated router, hub, adjacent neighbor, etc., as described above. In step 715, the router learns of the next-hop to reach a particular destination address prefix (e.g., prefix X) from the advertisement, and in step 720 determines whether the next-hop is located within the same broadcast network (e.g., LAN) as the designated router. For instance, the router may compare the local interface address and network mask to the next-hop's interface address, as described above. If the next-hop is not located in the same broadcast network in step 725, the router installs a route to the destination address prefix via the designated router in step 730, and the sequence ends at step 755.

If, however, the next-hop is located within the same broadcast network in step 725, the router further determines whether the next-hop is directly addressable (reachable) in step 735, e.g., using link adjacencies or request/reply messages 500 as described above. In the event the next-hop is not reachable in step 740, the router dynamically installs a route to the destination address prefix via the designated router (router A) into its routing table 600 in step 750, e.g., a designated router for the broadcast network or a hub for a hub-and-spoke network. Otherwise, in the event the next-hop is reachable in step 740, the router installs a route to the destination address prefix via the next-hop in step 745. The sequence 700 thus dynamically and efficiently installs the correct routing information to reach the destination address prefix into its routing table. As mentioned above, to continually update the status of the next-hop's reachability, the sequence 700 may return to step 735 periodically (e.g., based on a timer or otherwise as needed) to re-confirm the next-hop's reachability/unreachability, and may update the routing information to the destination address prefix as appropriate.

Advantageously, the novel technique dynamically configures and verifies routing information of broadcast networks using link state protocols in a computer network. By confirming that a next-hop to a destination address prefix is directly addressable, the novel technique efficiently and dynamically ensures that correct routing information is used in broadcast networks where the next-hop is conventionally assumed to be reachable, thus alleviating the need for cumbersome manual configuration or other network configurations. In particular, the present invention prevents the installation of unreachable next-hop routes at routers within the broadcast network (e.g., spoke routers or routers within a partial mesh network). Also, failed/removed routes or routes with otherwise limited connectivity between the router and the next-hop may be avoided by periodically confirming the reachability and replacing the failed/removed next-hop routes with routes to the designated router.

Those skilled in the art will appreciate that the present invention is different from the conventional next-hop resolution protocol (NHRP), used to discover "cut-throughs" between spoke routers in a full mesh hub-and-spoke network to learn reachability information between two spokes. The NHRP utilizes various tunneling protocols and other enhanced/extended routing mechanisms to determine which destination address prefixes may be reached through which other spoke routers, possibly within different networks. Notably, the present invention is based on the use of current routing protocols (OSPF and IS-IS) within a broadcast network, and is not used to obtain remote destination address prefix reachability information, but to configure and verify next-hop information within a broadcast network, particularly one that is partially meshed.

While there has been shown and described an illustrative embodiment that dynamically configures and verifies routing information of broadcast networks using link state protocols in a computer network, it is to be understood that various other adaptations and modifications may be made within the spirit and scope of the present invention. For example, the invention has been shown and described herein using physical links between routers. However, the invention in its broader sense is not so limited, and may, in fact, be used with virtual links or tunnels under certain conditions, as will be understood by those skilled in the art. Moreover, while the above description describes performing the technique with a designated router, the invention may also be advantageously used with backup designated routers in a similar manner. Further, while in most cases involving OSPF and IS-IS networks there is a single designated router or hub (in hub-and-spoke networks), those skilled in the art will understand that other routers within the network may be pseudo-designated routers for the sending router (router C), and may be selected as providing a host route to the destination prefix in accordance with the techniques described above. For example, the advertising router may be selected as the host route provider where the local router is unable to reach the designated router, such as in "stub" networks or broken networks.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically configuring and verifying routing information of broadcast networks using a link state protocol in a computer network, the method comprising:
   receiving, by a router, a link state protocol routing information advertisement from an advertising router in a broadcast network;
   learning of a next-hop router (next-hop) to reach a particular destination address prefix from the advertisement;
   determining, by the router, whether the next-hop is located within the same broadcast network as a designated router for the broadcast network;
   in response to determining the next-hop is located within the same broadcast network, verifying, by the router, whether the next-hop is directly addressable from the router, by checking whether an adjacency exists between the router and the next-hop in the link state protocol and by transmitting a request/reply message directly to the next-hop and determining whether a reply is received from the next-hop; and
   in response to determining the next-hop is not directly addressable, installing, by the router, a route to the destination address prefix via the designated router into a routing table.

2. An apparatus adapted to dynamically configure and verify routing information of broadcast networks using a link state protocol in a computer network, the apparatus comprising:
   means for receiving, at the apparatus, a link state protocol routing information advertisement from an advertising router in a broadcast network;
   means for learning of a next-hop router (next-hop) to reach a particular destination address prefix from the advertisement;
   means for determining, at the apparatus, whether the next-hop is located within the same broadcast network as a designated router for the broadcast network;
   means for determining, at the apparatus, whether the next-hop is directly addressable from the apparatus, by checking whether an adjacency exists between the apparatus and the next-hop in the link state protocol and by transmitting a request/reply message directly to the next-hop and determining whether a reply is received from the next-hop, in response to determining the next-hop is located within the same broadcast network; and
   means for installing, at the apparatus, a route to the destination address prefix via the designated router into a routing table, in response to determining the next-hop is not directly addressable.

3. A non-transitory computer readable medium containing program instructions for execution by a processor, for dynamically configuring and verifying routing information of broadcast networks using a link state protocol in a computer network, the executable program instructions comprising program instructions for:
   receiving, by a router, a link state protocol routing information advertisement from an advertising router in a broadcast network;
   learning of a next-hop router (next-hop) to reach a particular destination address prefix from the advertisement;
   determining, by the router, whether the next-hop is located within the same broadcast network as a designated router for the broadcast network;
   in response to determining the next-hop is located within the same broadcast network, verifying, by the router, whether the next-hop is directly addressable from the router, by checking whether an adjacency exists between the router and the next-hop in the link state protocol and by transmitting a request/reply message directly to the next-hop and determining whether a reply is received from the next-hop prevent installation of an unreachable next hop route at the router; and
   in response to determining the next-hop is not directly addressable, installing, by the router, a route to the destination address prefix via the designated router into a routing table.

4. A router for use with dynamically configuring and verifying routing information of broadcast networks using a link state protocol in a computer network, the router comprising:
   one or more network interfaces configured to receive a link state protocol routing information advertisement from an advertising router in a broadcast network;
   a processor coupled to the one or more network interfaces and configured to execute software processes; and a memory configured to store a routing table, the memory also configured to store a routing process executable by the processor, the routing process configured to:

i) learn of a next-hop router (next-hop) to reach a particular destination address prefix from the received advertisement;

ii) determine whether the next-hop is located within the same broadcast network as a designated router for the broadcast network;

iii) determine whether the next-hop is directly addressable by checking whether an adjacency exists between the router and the next-hop in the link state protocol and by transmitting a request/reply message directly to the next-hop and determining whether a reply is received from the next-hop, in response to determining the next-hop is located within the same broadcast network; and iv) in the event the next-hop is not directly addressable, install a route to the destination address prefix via the designated router into the routing table.

* * * * *